Figure 1:
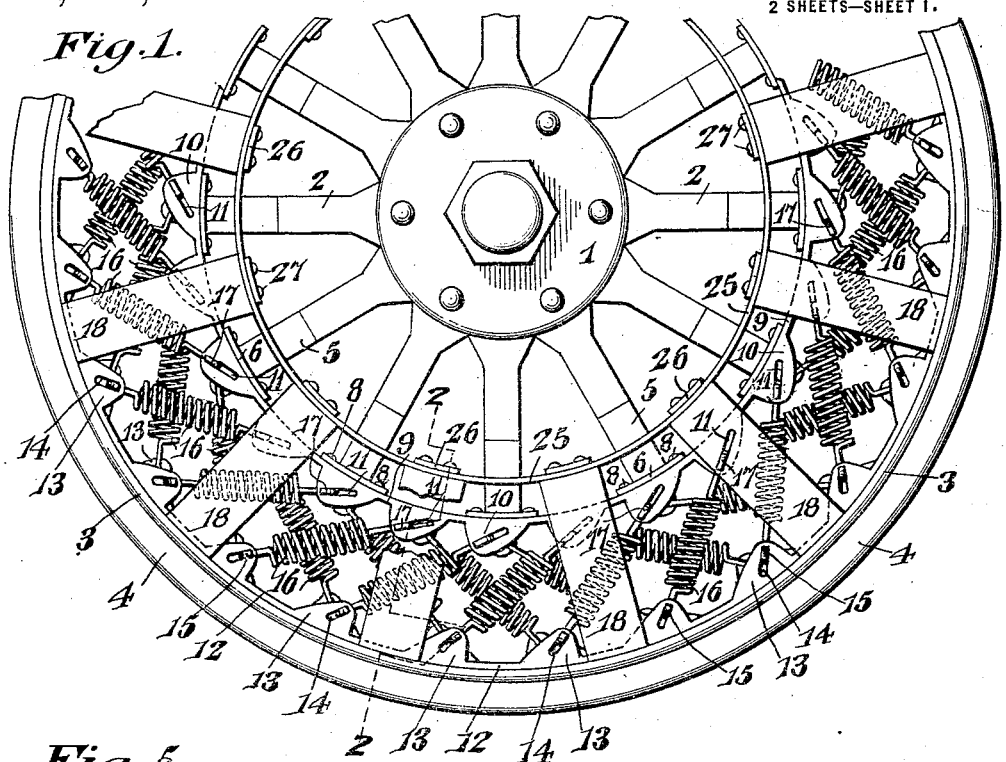

J. J. SOUTH.
RESILIENT WHEEL.
APPLICATION FILED JULY 14, 1915.

1,205,575.

Patented Nov. 21, 1916.
2 SHEETS—SHEET 1.

WITNESSES:
Jas. K. McCathran
F. T. Chapman.

J. J. South, INVENTOR
BY
Attorney

J. J. SOUTH.
RESILIENT WHEEL.
APPLICATION FILED JULY 14, 1915.
1,205,575.
Patented Nov. 21, 1916.
2 SHEETS—SHEET 2.
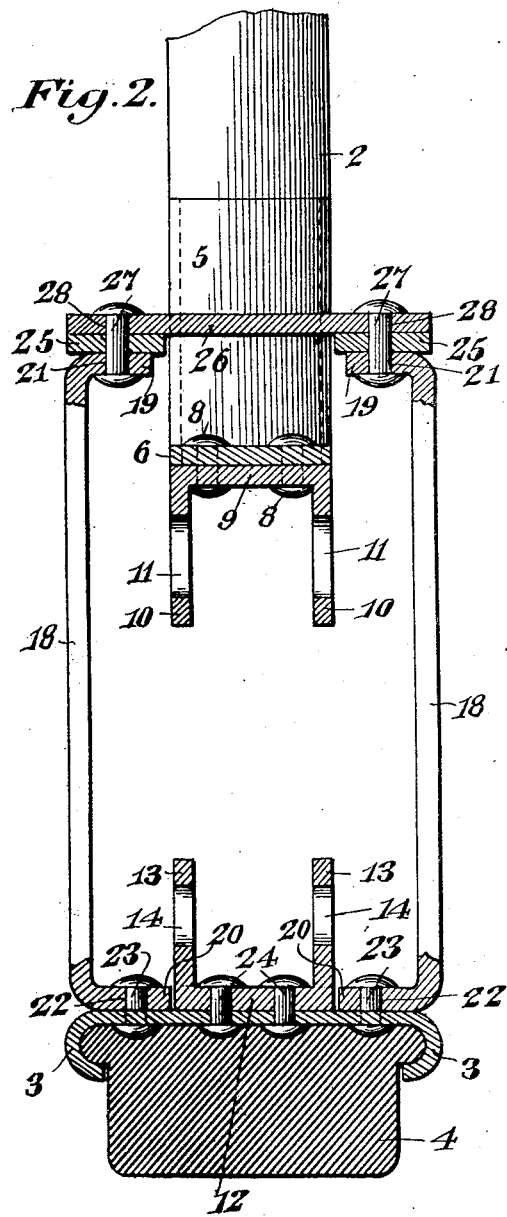
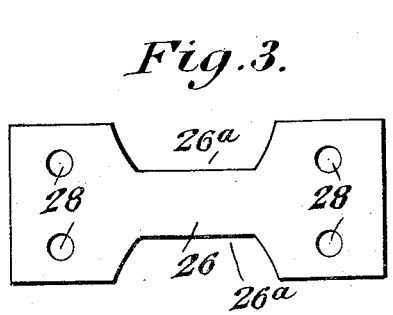
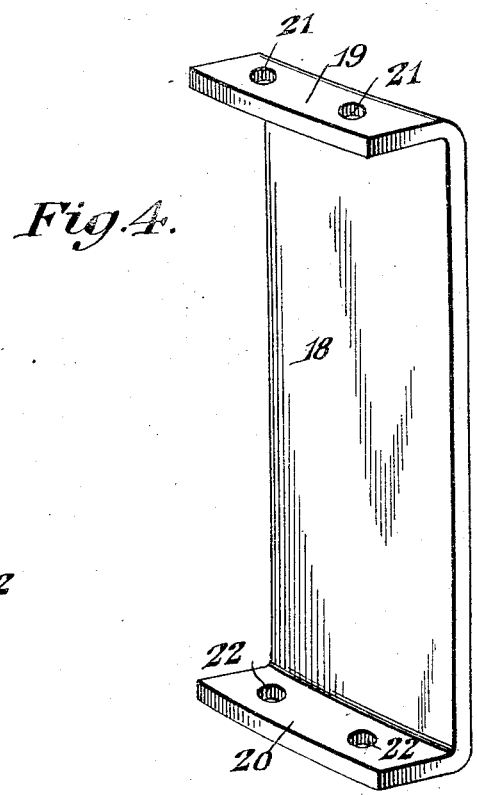
WITNESSES:
J. J. South, INVENTOR
BY
Attorney

UNITED STATES PATENT OFFICE.

JEROME JOHN SOUTH, OF MEMPHIS, TENNESSEE.

RESILIENT WHEEL.

1,205,575.   Specification of Letters Patent.   Patented Nov. 21, 1916.

Application filed July 14, 1915. Serial No. 39,842.

*To all whom it may concern:*

Be it known that I, JEROME J. SOUTH, a citizen of the United States, residing at Memphis, in the county of Shelby and State of Tennessee, have invented a new and useful Resilient Wheel, of which the following is a specification.

This invention has reference to resilient wheels and is designed more particularly to provide a wheel for automobiles, and other vehicles, in which springs are employed to provide the desired elasticity and whereby the necessity of a pneumatic tire is obviated, but a close approach to the effect of a pneumatic tire is retained.

In accordance with the present invention the hub, spokes and rim of the wheel may be similar to the like parts of automobile wheels as customarily constructed with the rim so made as to permit the use of a solid rubber tire for city use and a metallic tire for country use, if such be desirable.

The wheel of the present invention comprises a band to which the outer ends of the spokes are secured and by which they are properly spaced, and exterior to and normally concentric with this band is another and larger band designed to carry the tire. Both bands are provided at the sides with circular series of ears, those ears on one side of each band trending in one direction and provided with elongated slots of like trend, while the ears on the other side of the band have an opposite trend and are similarly slotted. The ears on each side of one band have a trend opposite to the ears on the same side of the other band. Extending between the ears of one band and those of the other are helical springs with hooked ends adapted to the elongated slots. The outer band has secured thereto a circular series of side braces and protectors extending toward the hub past the inner or spoke band and there connected on opposite sides of the spokes to rings which in turn are connected together between the spokes by cross ties. The slots carrying the springs and the springs themselves are so related to the wheel that they are tangential to a circle about midway between the normal location of the inner or spoke band and the rings to which the side braces are connected. The springs are so arranged that there are two series with the springs on one side of the wheel crossing in direction the springs on the other side of the wheel, wherefore one series of springs is always under a pulling strain and the other tends to draw together or collapse in accordance with the direction of rotation of the wheel.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

Figure 5:
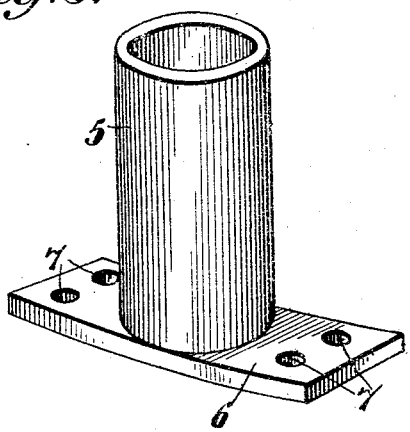
Figure 6:
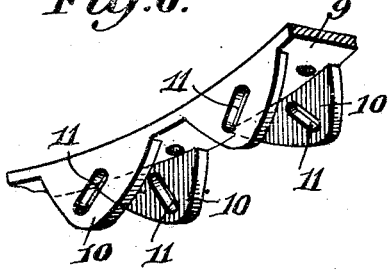

In the drawings:—Figure 1 is a front elevation of a portion of a wheel equipped with the invention. Fig. 2 is a section on the line 2—2 of Fig. 1 and drawn on a larger scale and omitting the springs and distant parts. Fig. 3 is a plan view of one of the tie plates. Fig. 4 is a perspective view of one of the side braces and protectors. Fig. 5 is a perspective view of a flanged thimble or socket for receiving the spokes. Fig. 6 is a fragmentary perspective view of the inner band.

Referring to the drawings there is shown a hub 1, spokes 2, rim 3 and tire 4 of a wheel, all of which parts are such as are customarily employed for automobile wheels, except that the spokes may be somewhat shortened.

The outer end of each spoke is seated in a thimble or socket member 5 having a flange 6 projecting oppositely from that end of the thimble remote from the end receiving the spoke. The flange 6 has suitable perforations 7 therethrough for rivets 8 by means of which the flange is secured to an endless band 9 of circular shape by means of which the outer ends of all the thimbles 5 and the outer ends of all the spokes 2 are held firmly in proper relation. At opposite edges of the band 9 the latter is formed with circular series of ears 10 each having a trend circumferentially of the band, and each ear has formed therein an elongated slot 11 trending in the same direction as the ear.

The ears of the series on one side of the band trend oppositely to the ears of the series on the opposite side of the band, and the same is true of the slots 11 in the ears.

The rim 3 is carried by an endless circular band 12 having a circular series of ears 13 on opposite sides, and these ears have elongated slots 14 therein. The ears 13 are equal in number to the ears 11 and like the ears 11 the two series of ears 13 trend oppositely. The slots 11 are longer than the slots 14 and may be approximately twice the length. Engaging in the slots 14 are hooked ends 15 of helical springs 16 having their opposite ends provided with hooks 17 engaging in the slots 11. The hooks 15 and 17 may differ in length in correspondence with the difference in lengths of the slots 14 and 11.

Since the ears 10 and 13 on opposite sides of the respective bands trend oppositely, the springs are consequently arranged in two series of opposite trend on opposite sides of the two bands.

Fast to the rim 3 to which the ring 12 is also fast is a circular series of elongated side braces or protectors 18 each consisting of a flat metallic plate with terminal flanges 19, 20, respectively, having perforations 21, 22, respectively. Rivets 23 extending through the passages 22 and like passages in the rim 3 serve to unite these two parts firmly together with the side braces on opposite sides of the band 12, which latter is connected to the rim 3 by rivets 24. The flanges 20 out-set the braces 18 from the band 12, so as to provide ample room for the two series of springs 16 without in any manner crowding the latter. The width of the space required for the braces 18 is only about that required for the rim 3, so that the wheel is no thicker, and usually not as thick as the ordinary automobile wheel with a pneumatic tire thereon.

The flanges 19 of the braces 18 on opposite sides of the wheel are connected by rings 25 with the rings themselves connected by cross ties 26. Rivets 27 extending through the perforations 21, other perforations in the rings 25 and perforations 28 in the cross ties 26 unite these parts firmly together with the rings 25 closer to the hub 1 than is the band 9 and on opposite sides of the thimbles 5 in close relation thereto. The ties 26, however, are, in the normal position of the parts, spaced a suitable distance inside of the band 9.

The ears 10 and 13 are so related that certain slots 11 aline with certain slots 14 and these certain alining slots are the ones engaged by the hooked ends of a spring so that the longitudinal center line of the spring and the alinement of the slots is tangential to a circle about midway between the band 9 and the rings 25 in the normal position of the parts.

The springs 16 are made of suitable gage material for the purpose for which they are intended and the coils of the springs are normally in contact when the springs are not under expansive strain. However, when the springs are lodged in the wheel structure with the ends 15 and 17 in respective slots 14 and 11, the springs are stretched to an extent which will permit them to have the desired degree of movement of elongation without putting the springs under undue strain and of contraction before the springs completely close up. Since the springs on one side of the wheel trend in a direction opposite to those on the opposite side of the wheel, any forces tending to turn the rim with relation to the hub will put one half of the springs under increasing tension, while the other half of the springs is closing, and these movements may continue until the closing series of springs has become completely closed and then these springs may move a short distance in the elongated slots, while the springs of the other series are elongating to a greater extent. In a position of rest the two series of springs are balanced and one or the other series will extend in accordance with the direction of travel of the wheel.

Should the wheel meet an obstruction, which obstruction usually acts upon the wheel at a point in advance, in the direction of travel, of the upright center line of the wheel, the tendency is to force the rim toward the band 9, this being opposed by a large portion of the springs, some directly, and others less directly, while some of the springs merely collapse toward the closed position. The rings 25 under such conditions move toward the hub on that portion of the wheel which engages the obstruction and toward the band 9 on that side of the wheel remote from the portion engaging the obstruction. The rings 25 are flat rings concentric with the axis of rotation and with their inner edges presented toward the thimbles 5, these latter, like the rings 25, being of metal. Any side movement causes the engagement of one of the rings 25 at its edge portion with the thimbles 5, but the edge portion of the ring is narrow and the thimbles 5 are round, so consequently any engagement which may occur is over very restricted surfaces, wherefore there is but little frictional resistance due to such engagement.

The side protectors and braces 18 are so located that their inner ends come between the lines of the spokes, and the cross ties 26 are also between the lines of the spokes. Intermediately these cross ties are cut out, as shown at 26$^a$ on opposite sides, and should it occur that there is sufficient movement of the rim or the spokes about the axis of the wheel in a direction circumferentially of the wheel to bring the spokes close to the cross ties 26, the spokes will enter the cut out portions 26$^a$ so that it is only under excessive conditions that these cross ties could come into contact with the spokes.

The springs are so disposed that strains brought upon them by any tendency of either the rim of the wheel or the hub of the wheel to rotate independently of the other part are in close approach to a direction longitudinal of the springs and there is but little tendency to bend the springs sidewise. Also movements of either the rim or hub portion of the wheel radially toward or from the other has a tendency to elongate some of the springs and relieve others of the springs of tension without side bending of the springs, while the hooked ends of the springs rock in the corresponding ends of the slots in which they are lodged.

All side movements of the rim with relation to the hub and spoke portion are resisted by the rings 25, but without undue frictional rubbing of the parts and the plates 18 being located outside of both the tire and the springs act as protectors in the case of the wheel coming into engagement with a curb or some other projection.

The wheel consists of but relatively few parts all rigidly connected together preferably by rivets, although not necessarily so, and a suitable number of springs, each of which is not subjected to such movements of expansion and contraction as shall be liable to cause skin strain and breakage of the springs. Should, however, a spring break it is not at all fatal to the continued action of the wheel and is readily replaceable at any time since on an automobile extra springs may be carried in the tool box and a broken spring may be quickly removed and replaced by a new spring without any necessity of dismantling any part of the wheel, as all parts are readily accessible.

In the wheel of the present invention frictional contact occurs only where the rings 25 may touch by their edge portions the rounded parts of the thimbles 5, and where the hooked ends of the springs engage the ears carrying them. The result is that friction is reduced to an almost negligible minimum and the wheel is particularly sensitive, since the vehicle body has a close approach to an elastic floating support because of the extreme reduction of frictional contact between any parts of the wheel.

The inner and outer bands with their ears may be formed of sheet metal rolled or stamped into shape with the ears in one piece with the bands, and the rings 25, cross ties 26 and spacing braces 18 are all susceptible of construction out of sheet metal stamped or pressed into shape. For this reason the wheel may be cheaply constructed and when constructed is exceptionally strong because sheet metal being rolled metal is particularly resistant to destructive forces.

What is claimed is:—

1. A resilient wheel having normally concentric radially spaced bands, one being connected to the spokes of the wheel and the other carrying the rim of the wheel, each band having a circular series of ears on opposite sides and each ear having an elongated slot therethrough trending in a direction circumferential of the wheel, the slots in the ears on one side having their circumferential trend opposite to that of the ears on the other side, and the slots of the ears of one band being of opposite trend to the corresponding slots of the ears of the other band, and extension coiled springs having their ends engaging in the slots of the respective ears.

2. A resilient wheel having normally concentric radially spaced bands, one being connected to the spokes of the wheel and the other carrying the rim of the wheel, each band having a circular series of ears formed on each edge and bent to extend radially from one face of the band toward the other band, each ear having an elongated slot therein with the slots of all the ears tangential to a circle between the inner band and the axis of the wheel and the slots of the ears on one side of a band trending circumferentially of the band in a direction opposite to the slots of the ears on the other side of the band, and the slots of the ears on one band being of opposite trend to that of the slots of the ears on the corresponding sides of the other band, and springs having ends engaging in the slots of the respective ears.

3. A resilient wheel having normally concentric radially spaced bands, each formed on opposite edges with slotted ears, one band being carried by the spokes of the wheel and the other band carrying the rim of the wheel, a circular series of springs connecting the bands and in engagement with the slotted ears thereof, with the springs in tangential arrangement to a circle described about the axis of the wheel, and the slots being elongated in the direction of the length of the springs and having substantially the same tangential arrangement as the springs, protecting braces carried by opposite sides of the rim and extending radially toward the hub beyond the inner band, separate rings on opposite sides of the spokes and fast to the corresponding sides of the braces, and tie plates connecting said rings and extending crosswise of the wheel between and in spaced relation to the spokes.

4. A resilient wheel comprising inner and outer normally concentric bands with the outer band carrying the rim of the wheel and the inner band provided with thimbles or sockets receiving the outer ends of the spokes of the wheel and in which the spokes are fixed, each band having ears on opposite edges matching corresponding ears of the other band, springs extending between the ears, side braces carried by the rim and extending beyond the inner band toward the hub of the wheel, rings on opposite sides of the thimbles joining the corresponding ends of the braces, and tie plates connecting the rings and extending crosswise of the wheel between and in spaced relation to the thimbles or sockets.

5. A resilient wheel comprising inner and outer normally concentric bands with the outer band carrying the rim of the wheel and the inner band provided with thimbles or sockets in which the outer ends of the spokes of the wheel are fixed, springs extending between and connecting the bands, side braces carried by the rim and extending beyond the inner band toward the hub of the wheel, flat rings joining the corresponding ends of the braces in normally concentric relation to the hub of the wheel and disposed on opposite sides of the thimbles receiving the spokes, and tie plates connecting the rings and extending crosswise of the wheel between and in spaced relation to the thimbles, the rings having edges presented toward the thimbles and the thimbles having their exteriors rounded where adjacent to the rings.

6. A resilient wheel having normally concentric members radially spaced apart, springs between and connecting the said members, radially disposed side braces connected to the outer member and extending toward the hub of the wheel, spoke receiving thimbles carried by the inner member, rings connecting the inner ends of the braces on opposite sides of the thimbles and having relatively narrow edges presented toward and adjacent to the thimbles, and tie plates joining the rings between and spaced from the spokes, whereby the thimbles serve as wear resisting members for preventing lateral movement of the rings and for limiting circumferential movements of the members of the wheel by engagement with the tie plates.

In testimony, that I claim the foregoing as my own, I have hereto affixed my signature in the presence of two witnesses.

JEROME JOHN SOUTH.

Witnesses:
 ROBERT MASON LAWRENCE,
 HARRY M. HALL.

Copies of this patent may be obtained for five cents each, by addressing the "Commissioner of Patents, Washington, D. C."